United States Patent
Morin et al.

(10) Patent No.: US 11,362,895 B2
(45) Date of Patent: Jun. 14, 2022

(54) AUTOMATIC CONFIGURATION OF AN EXTENDED SERVICE APPLIANCE FOR NETWORK ROUTERS

(71) Applicant: Nokia Solutions and Networks Oy, Espoo (FI)

(72) Inventors: Steve Morin, Ottawa (CN); John Fischer, Ottawa (CN); Peter Tregunno, Ottawa (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/786,152

(22) Filed: Feb. 10, 2020

(65) Prior Publication Data

US 2021/0250241 A1    Aug. 12, 2021

(51) Int. Cl.
*H04L 41/08* (2022.01)
*G06F 9/4401* (2018.01)
(Continued)

(52) U.S. Cl.
CPC ........ *H04L 41/0886* (2013.01); *G06F 9/4406* (2013.01); *G06F 9/45558* (2013.01);
(Continued)

(58) Field of Classification Search
CPC ............. H04L 41/0886; H04L 41/0843; H04L 45/586; H04L 47/781; G06F 9/4406; G06F 9/45558; G06F 2009/45595
See application file for complete search history.

(56) References Cited

U.S. PATENT DOCUMENTS

| | | | |
|---|---|---|---|
| 9,329,886 B2 * | 5/2016 | Vincent | G06F 9/45558 |
| 2009/0228629 A1 * | 9/2009 | Gebhart | G06F 8/63 |
| | | | 711/6 |

(Continued)

FOREIGN PATENT DOCUMENTS

WO   WO 2018/0232958 A1   12/2018

OTHER PUBLICATIONS

U.S. Appl. No. 16/786,164, filed Feb. 10, 2020, listing Steve Morin et al. as inventors, entitled "Backpressure From an External Processing System Transparently Connected to a Router".

(Continued)

*Primary Examiner* — Arvin Eskandarnia
(74) *Attorney, Agent, or Firm* — Tong, Rea, Bentley & Kim, LLC

(57) ABSTRACT

An external processing system includes a port to exchange signals with a router. The external processing system also includes a processor to receive, from the router via the port, information representing an operating system and a hypervisor in response to the external processing system being connected to the router via the port. The processor instantiates the operating system and the hypervisor based on the received information. The router includes a port allocated to an external processing system and configured to exchange signals with the external processing system. The router also includes a controller to provide, to the external processing system via the port, information representing the operating system and the hypervisor in response to the external processing system being connected to the external processing system via the port.

23 Claims, 8 Drawing Sheets

(51) Int. Cl.
  *G06F 9/455* (2018.01)
  *H04L 41/084* (2022.01)
  *H04L 45/586* (2022.01)
  *H04L 47/78* (2022.01)

(52) U.S. Cl.
  CPC ........ *H04L 41/0843* (2013.01); *H04L 45/586* (2013.01); *H04L 47/781* (2013.01); *G06F 2009/45595* (2013.01)

(56) References Cited

U.S. PATENT DOCUMENTS

| | | | | |
|---|---|---|---|---|
| 2012/0331464 | A1* | 12/2012 | Saito | G06F 9/45533 718/1 |
| 2013/0318255 | A1* | 11/2013 | Karino | H04L 45/00 709/238 |
| 2014/0298335 | A1* | 10/2014 | Regev | G06F 11/261 718/1 |

OTHER PUBLICATIONS

European Office Action mailed in corresponding EP 21152540.7-1213 dated Jun. 11, 2021, 13 pages.
Djohn, "Create a Virtual Machine on a Remote Server," Jan. 1, 2019, XP055807035, retrieved from URL https://docs.vmware.com/en/VMare-Fusion/12/com.vmware.fusion.using.doc/GUID-67E30EC7-74F2-4F75-B5AE-C3BC4711A2DD.html on May 25, 2021, 3 pages.

* cited by examiner

AUTOMATIC CONFIGURATION OF AN EXTENDED SERVICE APPLIANCE FOR NETWORK ROUTERS

BACKGROUND

Routers are one of the fundamental building blocks of networks. They are used to forward data packets from a source to a destination via the network that includes the router. In response to receiving a packet, the router reads a header of the packet to identify a destination of the packet, e.g., using a destination address included in the header. The router then forwards the packet to a next hop along the path to the destination using information stored in a routing table or a routing policy implemented by the router. High-performance routers are optimized to support capacities of hundreds of terabits per second in some cases and subsequent generations of routers are expected to achieve even higher routing capacities. In order to achieve these routing capacities, routers are typically constrained to perform a small set of operations that are directly related to routing. For example, the processors in the routers are optimized to examine the header of an incoming packet for a tuple that includes a source address, a destination address, and corresponding ports. The tuple is then used to forward the incoming packet to its next hop. Other content included in the packet, such as the packet payload, is ignored and the forwarding process is stateless, i.e., forwarding decisions are based only on information included in the incoming packet header and are not affected by any previous events or other packets.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
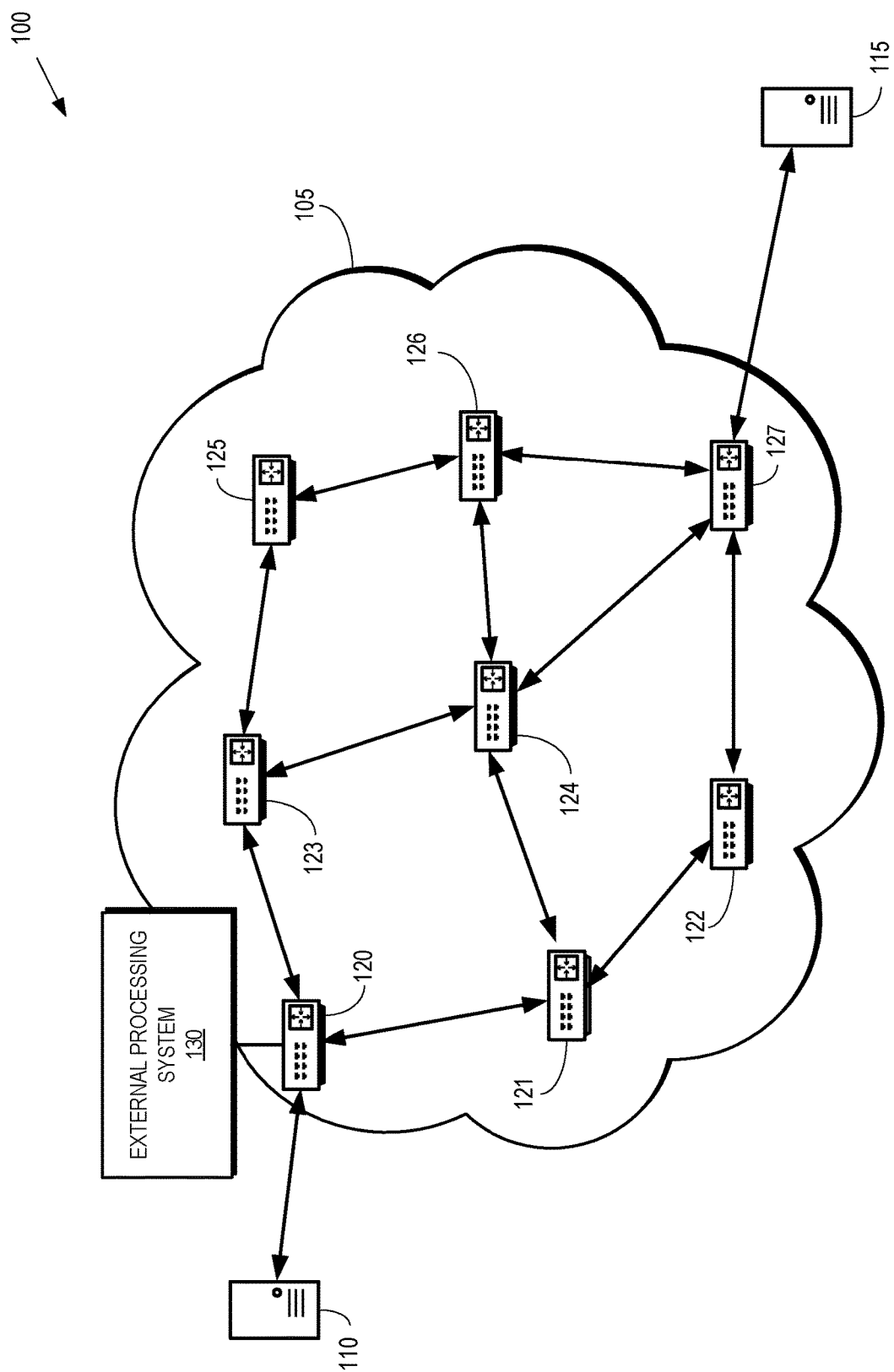
FIG. 1 is a block diagram of a communication system that supports the automatic configuration of an extended service appliance according to some embodiments.

Routers that are optimized for forwarding have a limited ability to perform other operations related to packet transmission through the network. Stateful processing, which tracks and uses information from previously received incoming packets is not implemented in conventional stateless routers. Conventional routers also have limited general-purpose computing resources to perform operations including packet inspection or manipulation of the payloads of incoming packets. Conventional routers therefore have limited or no ability perform operations such as network address translation, deep packet inspection, stateful firewalls, secure encryption/decryption according to protocols such as IPSec, video transcoding, video and content buffering, and the like. Additional general-purpose computing resources are sometimes incorporated into the router, e.g., by adding general-purpose processor cores to a router control card that provides centralized compute resources for input/output (I/O) functions or distributed compute resources for I/O functions that are distributed over multiple user plane forwarding line cards (also referred to herein as "blades") in the router system. However, these approaches require that the routing functionality in the general-purpose functionality share computing resources including board space, central processing units (CPUs) memory, thermal dissipation hardware, and the like, which reduces availability of these resources for the routing functionality.

General-purpose computing resources can also be provided to complement the routing function by using specialized hardware. For example, the router system can include additional blades dedicated to packet processing that are inserted into existing router I/O slots within the system chassis. Although dedicating a general-purpose processing blade to a router I/O slot increases the processing scale and capacity, the general-purpose processing blade consumes a scarce I/O slot and therefore reduces the overall system I/O capacity. The characteristics of the slot also constrain the amount of board space, power distribution, and other resources available to the general-purpose processing blade. For another example, the router systems (or the general-purpose compute functions) can be implemented using network function virtualization (NFV) to perform the routing and general-purpose compute functions on a general-purpose computer server. Implementing a router system using NFV trades off scale, performance and cost to maximize flexibility relative to a dedicated router system. In practice, NFV-based router systems introduce costs and complexities that may not be competitive with dedicated hardware routers when implementing large-scale user plane functionality. Simply offloading the general-purpose computing to an NFV system requires steering traffic from the dedicated router system to the NFV functions, which requires additional (as well as complex and costly) user plane or management plane mechanisms to transfer and synchronize states between the dedicated router and the NFV functions.

FIGS. 1-8 disclose embodiments of a communication system that combines the high performance of a dedicated router with the flexibility of a virtualized architecture by connecting an external processing system to the dedicated router via one of the routing ports of the dedicated router. An interconnection port of the dedicated router is allocated to the external processing system and supports communication with the external processing system. In some embodiments, multiple interconnection ports are allocated to support multiple external processing systems. In response to the dedicated router detecting attachment of the external processing system to an interconnection port, a controller implemented in the dedicated router provides information representing an operating system and a hypervisor to the external processing system, which installs the operating system and the hypervisor using the provided information. Some embodiments of the external processing system perform a dynamic discovery process to discover a management Internet protocol (IP) address for the external processing system and obtain software configuration information from the controller. The external processing system is subsequently booted up using the installed operating system and hypervisor. Using the installed operating system and hypervisor, the dedicated router instantiates one or more virtual machines (VMs) that execute software to perform general-purpose functions including network address translation, secure encryption/decryption, video transcoding, buffering, and filtering on packets received from the dedicated router. Resources are allocated to the VMs based on requirements of the corresponding general-purpose functions. Results of the general-purpose functions performed by the VMs are returned to the dedicated router via the interconnection port.

FIG. 1 is a block diagram of the communication system 100 that supports the automatic configuration of an extended service appliance according to some embodiments. The communication system 100 includes a network 105 that provides communication pathways between a server 110 and a server 115. However, some embodiments of the network 105 provide communication pathways between other entities or users including desktop computers, laptop computers, tablet computers, smart phones, Internet of Things (IoT) devices, and the like. The communication system 100 includes a set of routers 120, 121, 122, 123, 124, 125, 126, 127, which are collectively referred to herein as "the routers 120-127."

Some embodiments of the routers 120-127 implement stateless forwarding to forward packets based on information included in the packets. In response to receiving a packet, the routers 120-127 read a header of the packet to identify a destination of the packet, e.g., using a destination address included in the header. The routers 120-127 forward the packet to a next hop along the path to the destination using information stored in a routing table or a routing policy implemented by the router. For example, the router 120 includes routing table that is used to determine the next hop for a packet received with the source address of the server 110 and the destination address of the server 115. If the routing table indicates that the router 121 is the next hop, the router 120 forwards the packet to the router 121.

As discussed herein, the stateless routers 120-127 are optimized for forwarding and therefore have a limited ability to perform other operations related to packet transmission through the network. External processing systems (also referred to herein as extended service appliances) 130 are therefore provided to enhance the capabilities of the stateless routers 120-127. In the interest of clarity, a single external processing system 130 is shown connected to the router 120 in FIG. 1. However, other external processing systems are connected to the other routers 121-127 in some embodiments. The external processing system 130 is connected to the router 120 via an interconnection port (not shown in FIG. 1) in the router 120. The interconnection port is one of a plurality of interconnection ports that are used to connect entities including the server 110, the router 121, and the router 123 to the router 120. The router 120 is therefore able to route packets received from one of the connected entities (i.e., the server 110, the router 121, the router 123, and the external processing system 130) to another one of the connected entities (i.e., the server 110, the router 121, the router 123, and the external processing system 130).

The external processing system 130 is powered up and connected to the router 120. Prior to installation, the external processing system 130 does not implement an operating system or a hypervisor, e.g., the external processing system 130 is referred to as a "bare metal" system. In response to connecting the external processing system 130, the router 120 generates information representing an operating system and a hypervisor and provides this information to the external processing system 130. The external processing system 130 instantiates the operating system and the hypervisor based on the received information and then the external processing system 130 boots up using the instantiated operating system. At this point, the external processing system 130 is available to instantiate virtual machines (VMs) that perform general-purpose computing on behalf of the router 120.

In operation, the router 120 generates commands that instruct the external processing system 130 to instantiate one or more VMs to perform general-purpose computing. Some embodiments of the commands include information indicating a type of the VM and a request for resources to be allocated to the VM by the external processing system 130. Using the installed operating system and hypervisor, the router 120 instantiates the requested VM based on the requested type and resource allocation. Examples of general-purpose functions that are performed by the VMs instantiated on the external processing system 130 include, but are not limited to, network address translation, secure encryption/decryption, video transcoding, buffering, and filtering on packets received from the router 120. Some embodiments of the router 120 request resource allocations to the VMs based on requirements of the corresponding general-purpose functions. The external processing system 130 returns results of the general-purpose functions performed by the VMs to the router 120 via the interconnection port.

Figure 2:
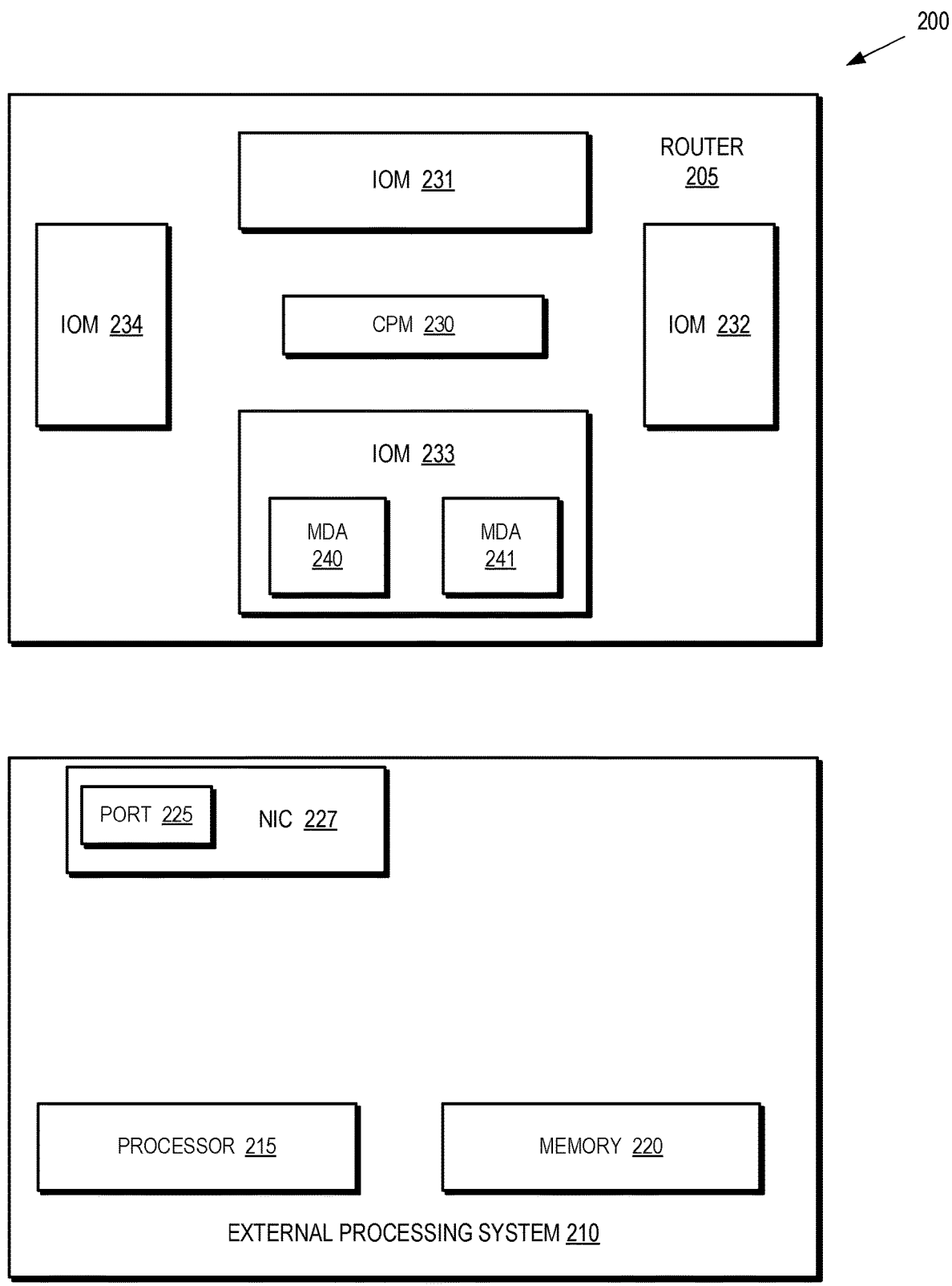
FIG. 2 is a block diagram of a communication system that includes a router and an external processing system according to some embodiments.

FIG. 2 is a block diagram of a communication system 200 that includes a router 205 and an external processing system 210 according to some embodiments. The router 205 and the external processing system 210 are not connected in FIG. 2. The external processing system 210 is therefore in a "bare metal" state and does not have been operating system or hypervisor installed. The external processing system 210 includes a processor 215 and a memory 220. The processor 215 executes instructions stored in the memory 220 and stores information in the memory 220 such as the results of the executed instructions. Some embodiments of the processor 215 include multiple cores or compute units to independently or concurrently execute instructions. The external processing system 210 also includes one or more ports 225, although only one port 225 is shown in FIG. 2 in the interest of clarity. The port 225 is implemented as an electrical port, an optical port, or other type of port. Some embodiments of the port 225 are implemented using a network interface card (NIC) 227. When connected to the router 205, the port 225 supports the exchange of information with the router 205.

Some embodiments of the router 205 include a controller such as a control processing module (CPM) 230 and a set of input/output (I/O) modules (IOMs) 231, 232, 233, 234, which are collectively referred to herein as "the I/O modules 231-234." Although four I/O modules 231-234 are shown in FIG. 2, some embodiments of the router 205 include more or fewer I/O modules. The CPM 230 and the I/O modules 231-234 are implemented as hard-coded or programmable logic, one or more processors executing software/firmware instructions, or any combination thereof. The CPM 230 or the IOM 231-234 performs operations including extracting address information from packet headers, performing table lookups based on the extracted address information, and routing the packets based on next hop information retrieved by the table lookups. For example, if the I/O module 231 receives a packet from another router, the I/O module 231 inspects a header of the packet to determine a destination address for the packet and uses a table lookup to determine a next hop for the packet. Based on the next hop information, the CPM 230 or one of the I/O modules 231-234 routes the packet, e.g., by forwarding the packet to another I/O module 231-234, which forwards the packet to the next hop destination.

The I/O modules 231-234 support input and output operations for packets that are received and transmitted by the router 205. The I/O modules 231-234 include one or more media dependent adapters (MDAs) 240, 241 that support one or more ports for connections to entities including servers, other routers, and the external processing system 210. In the illustrated embodiment, some resources of the I/O module 233 (including the MDAs 240, 241) are allocated to the external processing system 210. Other resources of the I/O module 233 are allocated to other external systems or routers (not shown in FIG. 2 in the interest of clarity). The CPM 230 therefore monitors connections to the I/O module 233 to detect attachment or connection of the external processing module 210 to the router 205.

Figure 3:
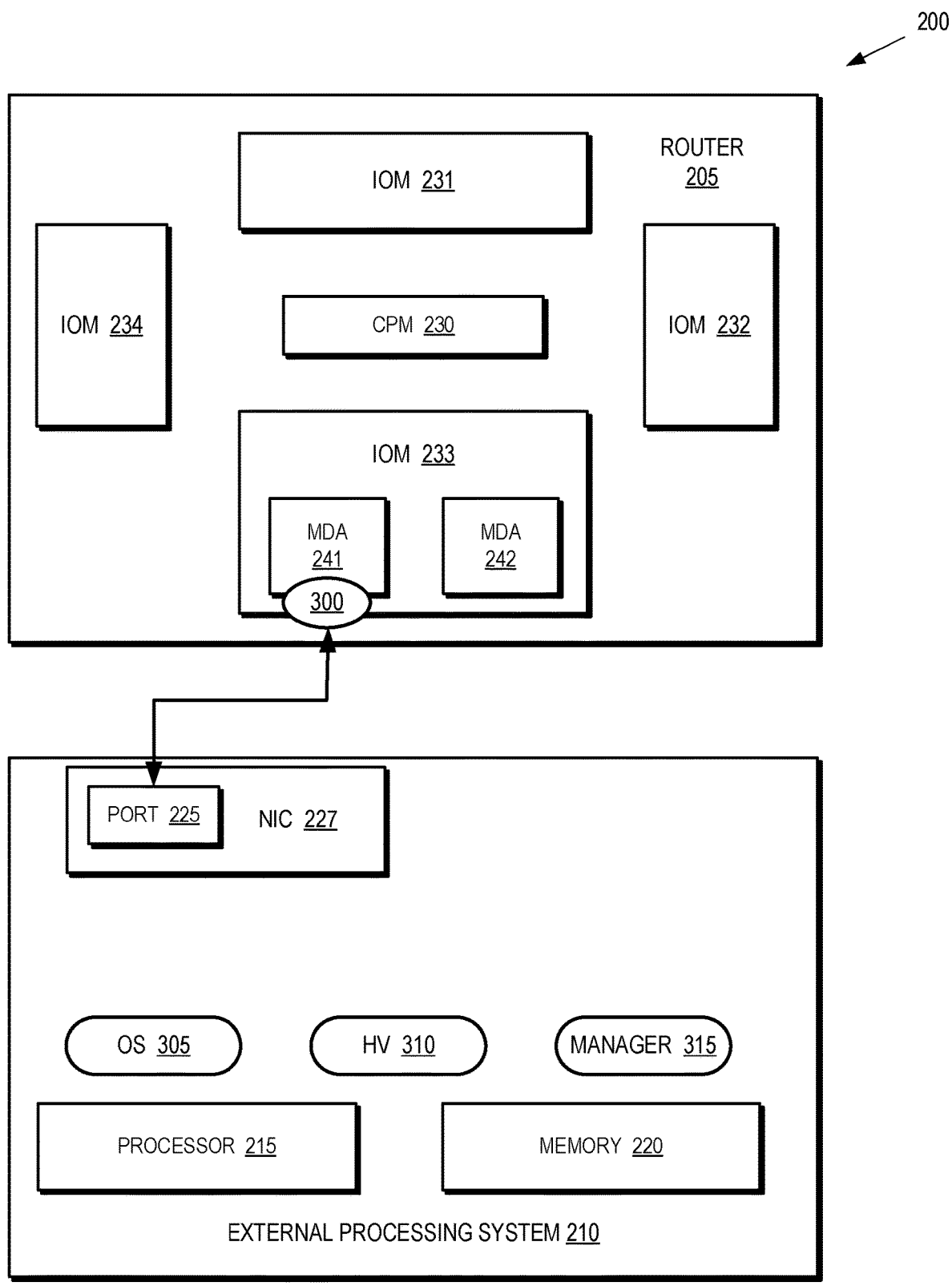
FIG. 3 is a block diagram of the communication system after connection of the external processing system to the router according to some embodiments.

FIG. 3 is a block diagram of the communication system 200 after connection of the external processing system 210 to the router 205 according to some embodiments. In response to connecting the external processing system 210 to the router 205 via the port 225 and a corresponding port 300 in the MDA 241, the CPM 230 generates information representative of an operating system and a hypervisor. The CPM 230 then provides information to the external processing system 210 via the MDA 241 in the IOM 233. In some embodiments, the processor 215 performs a dynamic discovery process to discover a management Internet protocol (IP) address of the external processing system 210 in response to the external processing system 210 being connected to the router 205 via the port 225 and the port 300. The processor 215 also receives software configuration information from the router 205 via the port 225 and the port 300.

The external processing system 210 uses the provided information to instantiate an operating system 305 and a hypervisor 310. In some embodiments, the hypervisor 310 is a Linux-based hypervisor that supports execution of one or more virtual machines (VMs). Some embodiments of the hypervisor 310 are implemented using a resilient connection to the CPM 230. For example, a momentary or temporary disconnect of the port connections (e.g., the port 225 or the port 250) between the external processing system 210 and the router 205 does not cause reboot or reconfiguration of the external processing system 210 until the duration of the disconnect exceeds a threshold value. A manager 315 and the CPM 230 exchange heartbeat messages that are used to determine whether the router 205 and the external processing system 210 are communicating correctly.

Figure 4:
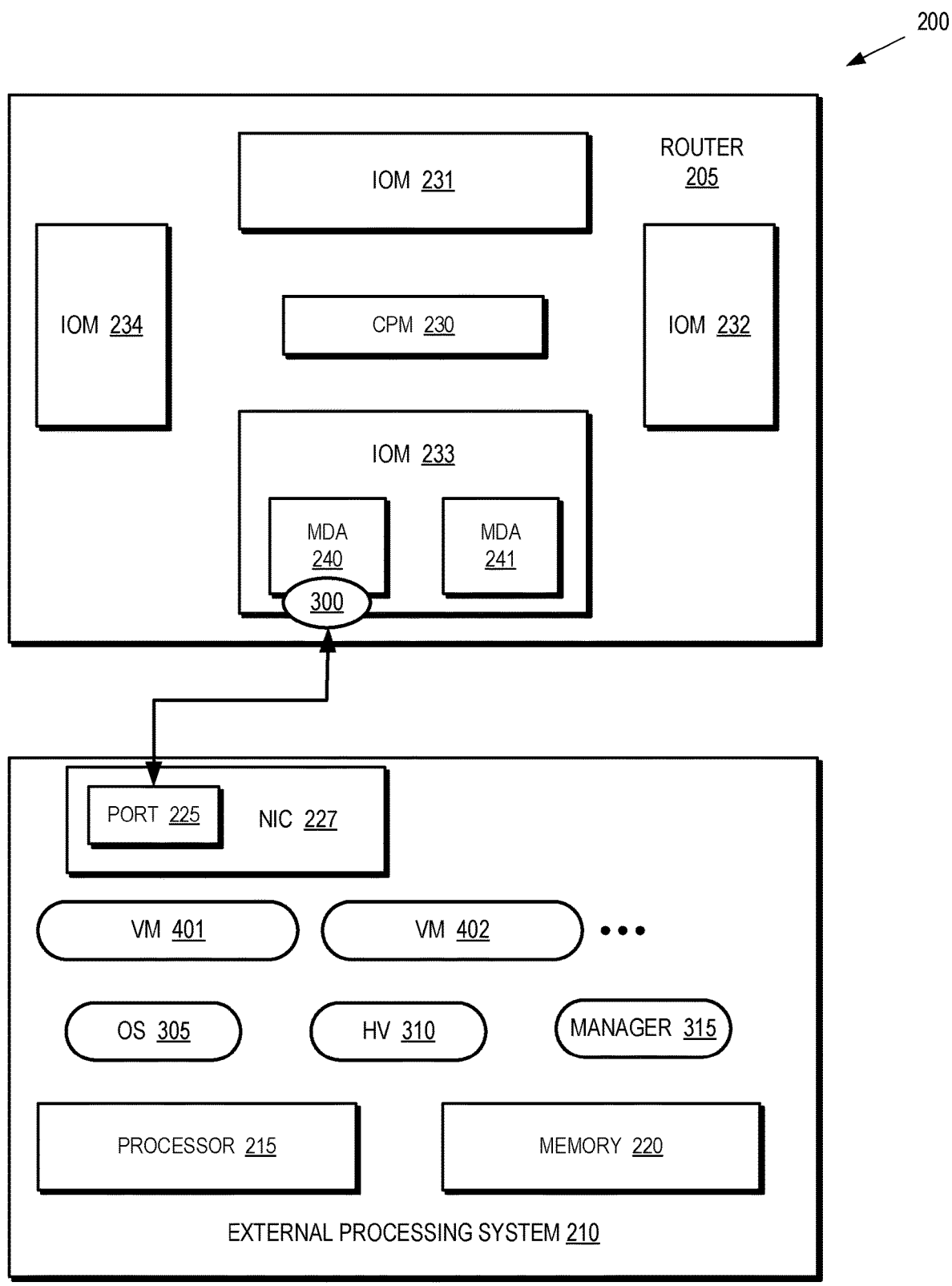
FIG. 4 is a block diagram of the communication system after instantiation of one or more virtual machines on the external processing system according to some embodiments.

FIG. 4 is a block diagram of the communication system 200 after instantiation of one or more virtual machines 401, 402 on the external processing system 210 according to some embodiments. The manager 315 running on the OS 305 in the external processing system 210 instantiates virtual machines 401, 402 based on the operating system 305 and the hypervisor 310 in response to commands received from the router 205 via the port 225. In some embodiments, the commands include information indicating types of the virtual machines 401, 402 and resources to be allocated to the virtual machines 401, 402. For example, the types can indicate services that run on virtualized integrated services adapters (v-ISAs) to provide v-ISA functions and the resources can indicate a number of cores of the processor 215, a portion of the memory 220, and the like. The virtual machines 401, 402 are used to implement operations performed on packets received from the router 205. In some embodiments, the operations include network address translation, secure encryption/decryption, video transcoding, buffering, and filtering on packets received from the router 205. The processor 215 stores results of the operations in the allocated memory 220 and returns the results to the router 205 via the port 225 and the IOM 233

The following configuration fragment is an example of a command set executed on the CPM 230 to configure the virtual machines 401, 402 using information that indicates an AA-type virtual machine and a BB type virtual machine. The configuration fragment also indicates numbers of cores to allocate to the virtual machines 401, 402 (e.g., twelve cores are allocated to the VM type AA and nine cores are allocated to the VM type BB) and an amount of memory to be allocated to the virtual machines 401, 402 (e.g., 20 GB are allocated to the VM type AA and 40 GB are allocated to the VM type BB).

```
configure
    esa 1 create
        description "Esa for AA-BB"
        host-port 1/1/1
        vm 1 create
            description "Application-Assurance ISA"
            vm-type aa
            host-port 1/1/1
            cores 12
            memory 20 GB
            no shutdown
        exit
        vm 2 create
            description "Broadband ISA"
            vm-type bb
            host-port 1/1/1
            cores 9
            memory 40 GB
            no shutdown
        exit
```

The external processing system 210 supports one or more thresholds of communication detection between the router 205 and the external processing system 210, and these are independent from the conventional port hold timers typically implemented on the I/O modules 231-234. In some embodiments, a first threshold is used to detect VM failure, e.g., failure of one or more of the VM 401, 402. In response to detecting VM failure based on the first threshold, only the VM associated with a timer that exceeds the first threshold is reset. For example, if the CPM 230 detects a problem with the VM 401, the VM 401 is reset and the VM 402 is unaffected by the reset. The OS 305 and the hypervisor 310 are also unaffected by the reset of the VM 401. A second threshold is used to detect issues with the OS 305 or the hypervisor 310. The external processing system 210 is reset in response to a corresponding timer exceeding the second threshold. In some cases, the CPM 230 resets the whole external processing system 210 without reinstalling new software to implement the operating system 305 or the hypervisor 310. In other cases, the CPM 230 installs new software to implement the operating system 305, the hypervisor 310, or both and then resets the whole external processing system 210 based on the reinstalled operating system 305 or hypervisor 310. The external processing system 210 also resets in response to failure of the port 225 or the port 300 supported by the MDA 240.

As discussed below, some embodiments of the router 205 support additional ports that are used to connect to additional ports in the external processing system 210 or ports in other external processing systems (not shown in FIGS. 2-4). For example, the MDA 240 can support an additional port that connects to other ports on the external processing system 210, or a port in another external processing system (not shown in FIGS. 2-4), or to another router, e.g., the routers 121 or 123 shown in FIG. 1. The additional ports may be associated with virtual machines that are instantiated by the external processing system 210 or other external processing systems (not shown in FIGS. 2-4), or other routers (not shown in FIGS. 2-4).

Figure 5:
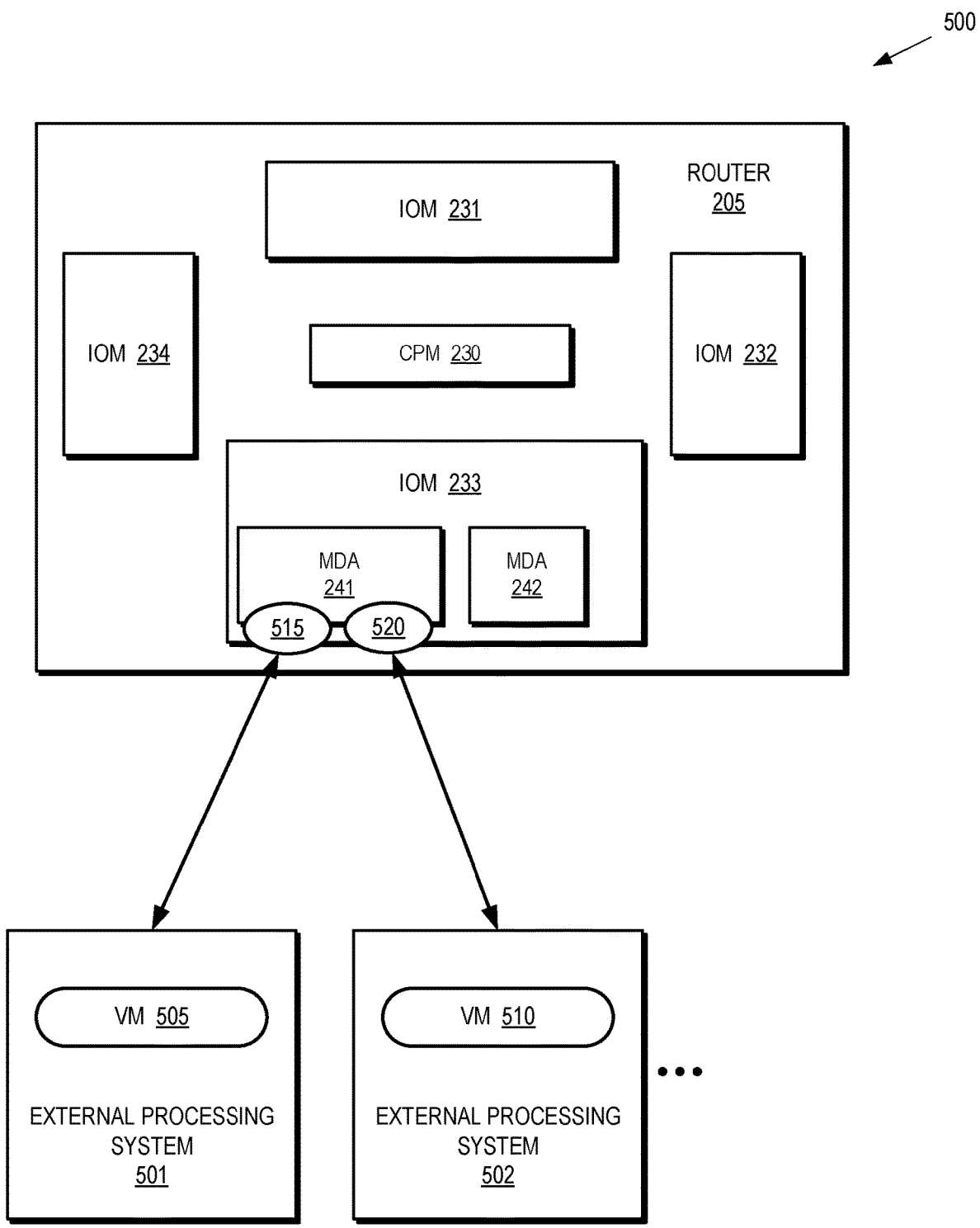
FIG. 5 is a block diagram of a communication system including a router that is connected to multiple external processing systems according to some embodiments.

FIG. 5 is a block diagram of a communication system 500 including a router 205 that is connected to multiple external processing systems 501, 502 according to some embodiments. Although not shown in FIG. 5 in the interest of clarity, the external processing systems 501, 502 instantiate corresponding operating systems and hypervisors using information provided by the router 205, as discussed herein. The external processing systems 501, 502 also instantiate corresponding virtual machines 505, 510 using information provided by the router 205, as discussed herein. The virtual machines 505, 510 are used to perform operations on packets routed to the external processing systems 501, 502, respectively, by the router 205. In some embodiments, the virtual machines 505, 510 perform different operations on the received packets before providing the results of the operations to the router 205 via the corresponding ports 515, 520. The external processing systems 501, 502 are associated with different ports 515, 520 supported by the MDA 241 in the IOM 233.

In operation, the router 205 receives packets via the IOMs 231-234 and determines whether to perform an operation using the resources allocated in one or more of the external processing systems 501, 502. If so, the router 205 routes the packet to the appropriate external processing system 501, 502 and the corresponding virtual machine 505, 510 perform the operation on the packet and provides the results to the router 205. For example, the router 250 can route a packet to the virtual machine 505 to perform decryption of encrypted information in a payload of the packet. A packet including the decrypted information is then returned to the router 205. For another example, the router 205 can route the packet to the virtual machine 510 to perform video transcoding on data in the payload of the packet. A packet including the transcoded data is then returned to the router 205. In some embodiments, the operations performed by the virtual machines 505, 510 are sequentially implemented. For example, the router 205 can route a packet to the virtual machine 505 to decrypt a payload of the packet. The decrypted payload is returned to the router 205. The router 205 subsequently routes the packet including the decrypted payload to the external processing system 502 and instructs the virtual machine 510 to perform video transcoding on the decrypted payload. The packet including the transcoded data is then returned to the router 205 for routing to another entity.

Figure 6:
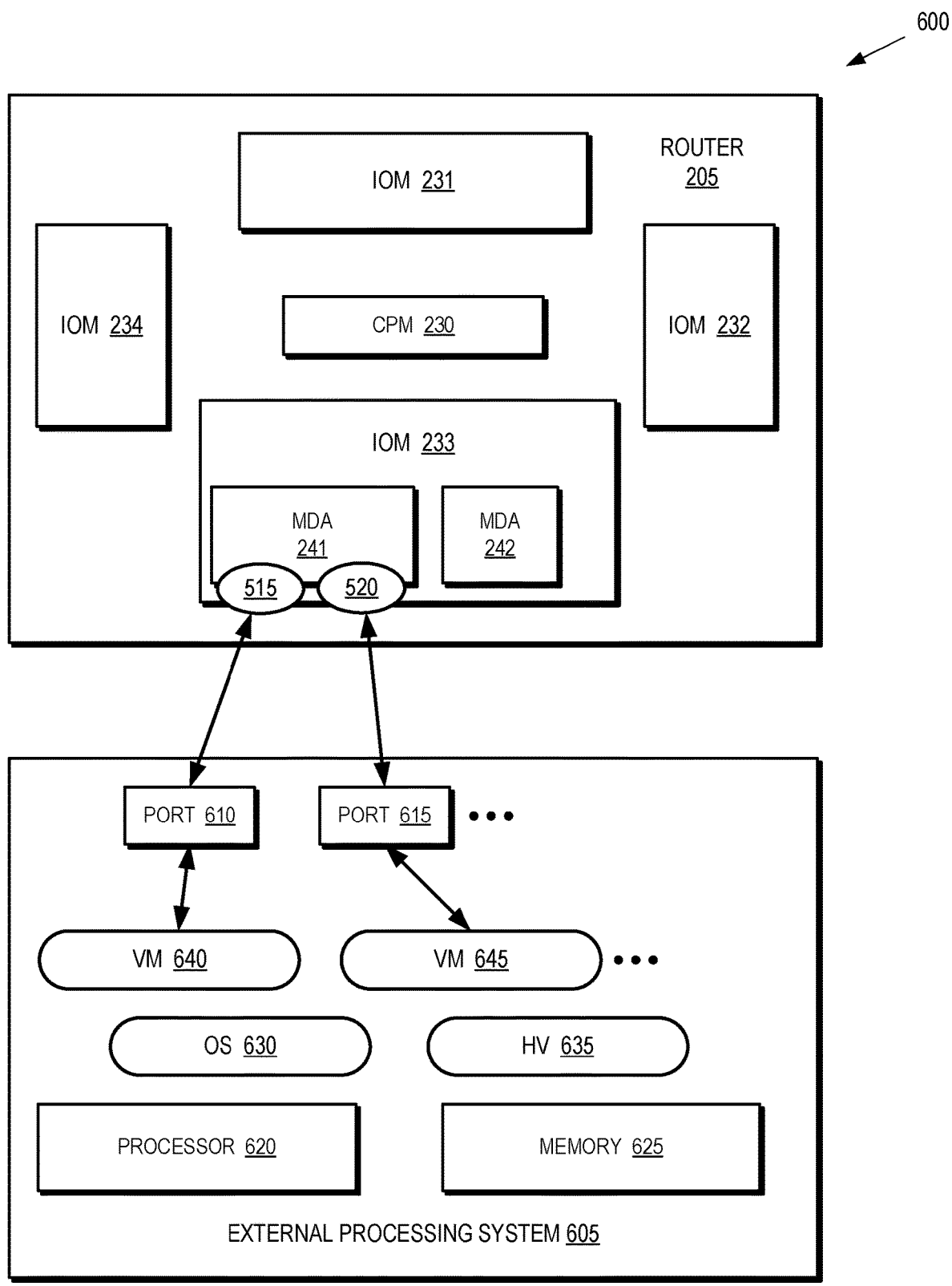
FIG. 6 is a block diagram of a communication system including a router that is connected to an external processing system that includes multiple ports according to some embodiments.

FIG. 6 is a block diagram of a communication system 600 including a router 205 that is connected to an external processing system 605 that includes multiple ports 610, 615 according to some embodiments. The external processing system 605 is initially in a "bare metal" state and does not have been operating system or hypervisor installed. The external processing system 605 includes a processor 620 and a memory 625. The processor 620 executes instructions stored in the memory 625 and stores information in the memory 625 such as the results of the executed instructions.

In response to connection to the router 205 via the ports 515, 520, the external processing system 605 instantiates an operating system 630 and a hypervisor 635 using information provided by the router 205, as discussed herein. The external processing system 605 also instantiates corresponding virtual machines 640, 645 using information provided by the router 205, as discussed herein. The virtual machines 640, 645 are used to perform operations on packets routed to the external processing system 605 by the router 205. In some embodiments, the virtual machines 640, 645 perform different operations on the received packets before providing the results of the operations to the router 205 via the corresponding ports 515, 520. The virtual machines 640, 645 are associated with different ports 515, 520 supported by the MDA 241 in the IOM 233. As discussed herein, the virtual machines 640, 645 are used independently to perform different operations on packets routed to the external processing system 605 via the ports 515, 520 in some cases and, in other cases, the operations performed by the virtual machines 640, 645 (as well as other virtual machines not shown in FIG. 6) are sequentially implemented.

Figure 7:
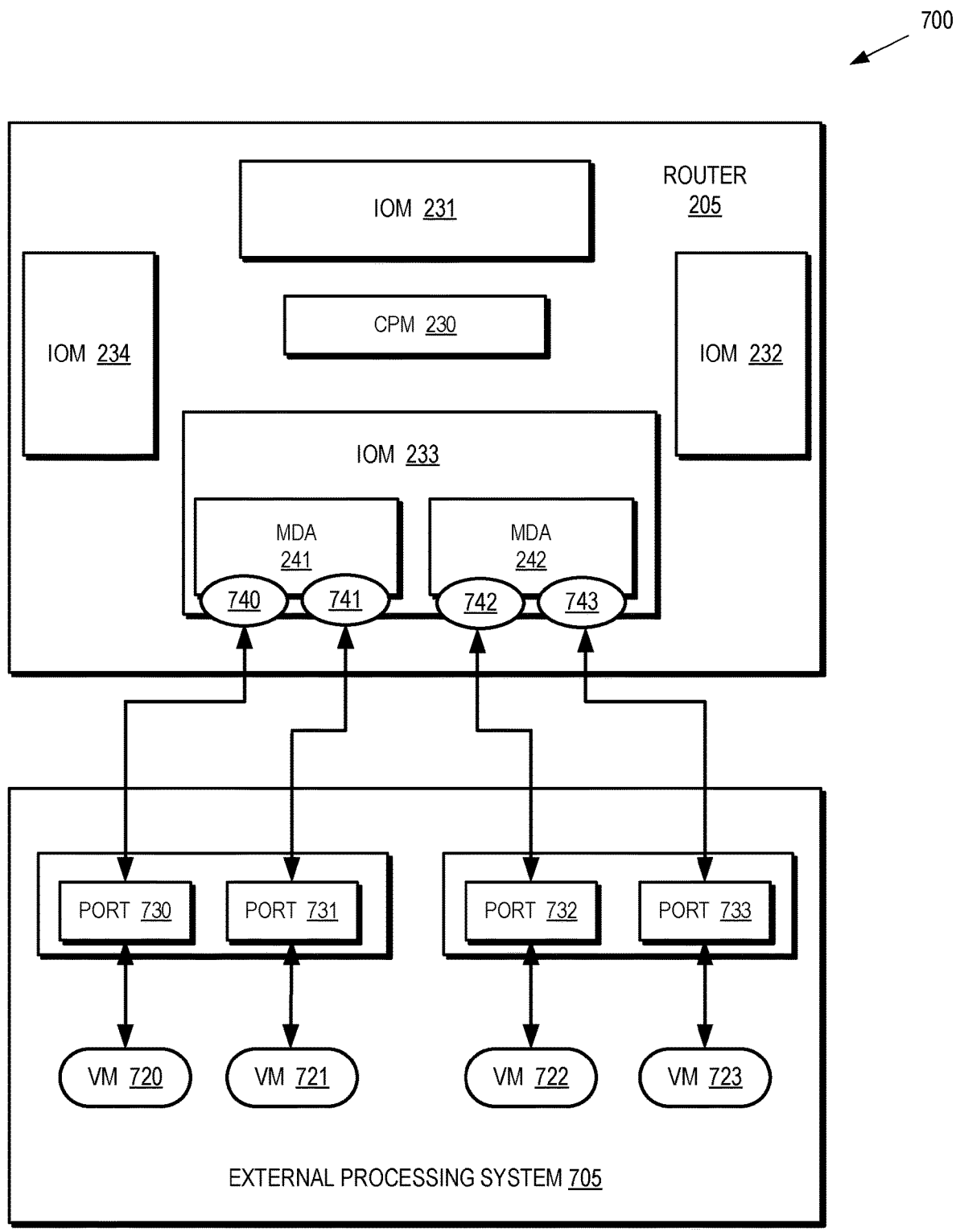
FIG. 7 is a block diagram of a communication system including a router that is connected to an external processing system that includes multiple ports according to some embodiments.

FIG. 7 is a block diagram of a communication system 700 including a router 205 that is connected to an external processing system 705 that includes multiple ports 710, 711, 712, 713 according to some embodiments. Although not shown in FIG. 7 in the interest of clarity, the external processing system 705 instantiates an operating system and a hypervisor using information provided by the router 205, as discussed herein. The external processing system 705 also instantiates virtual machines 720, 721, 722, 723 (collectively referred to herein as "the virtual machines 720-723") using information provided by the router 205, as discussed herein. The virtual machines 720-723 are used to perform operations on packets routed to the external processing systems 705 by the router 205. The packets are routed to the virtual machines 720-723 via ports 730, 731, 732, 733 (collectively referred to herein as "the ports 730-733") in the external processing system 705 and ports 740, 741, 742, 743 (collectively referred to herein as "the ports 740-743") in the router 205. In some embodiments, the virtual machines 720-723 perform different operations on the received packets before providing the results of the operations to the router 205 via the corresponding ports 730-733, 740-743. As discussed herein, the virtual machines 720-723 are used independently to perform different operations on packets routed to the external processing system 705 via the ports 730-733, 740-743 in some cases and, in other cases, the operations performed by subsets of the virtual machines 720-723 (as well as other virtual machines not shown in FIG. 7) are sequentially implemented.

Figure 8:
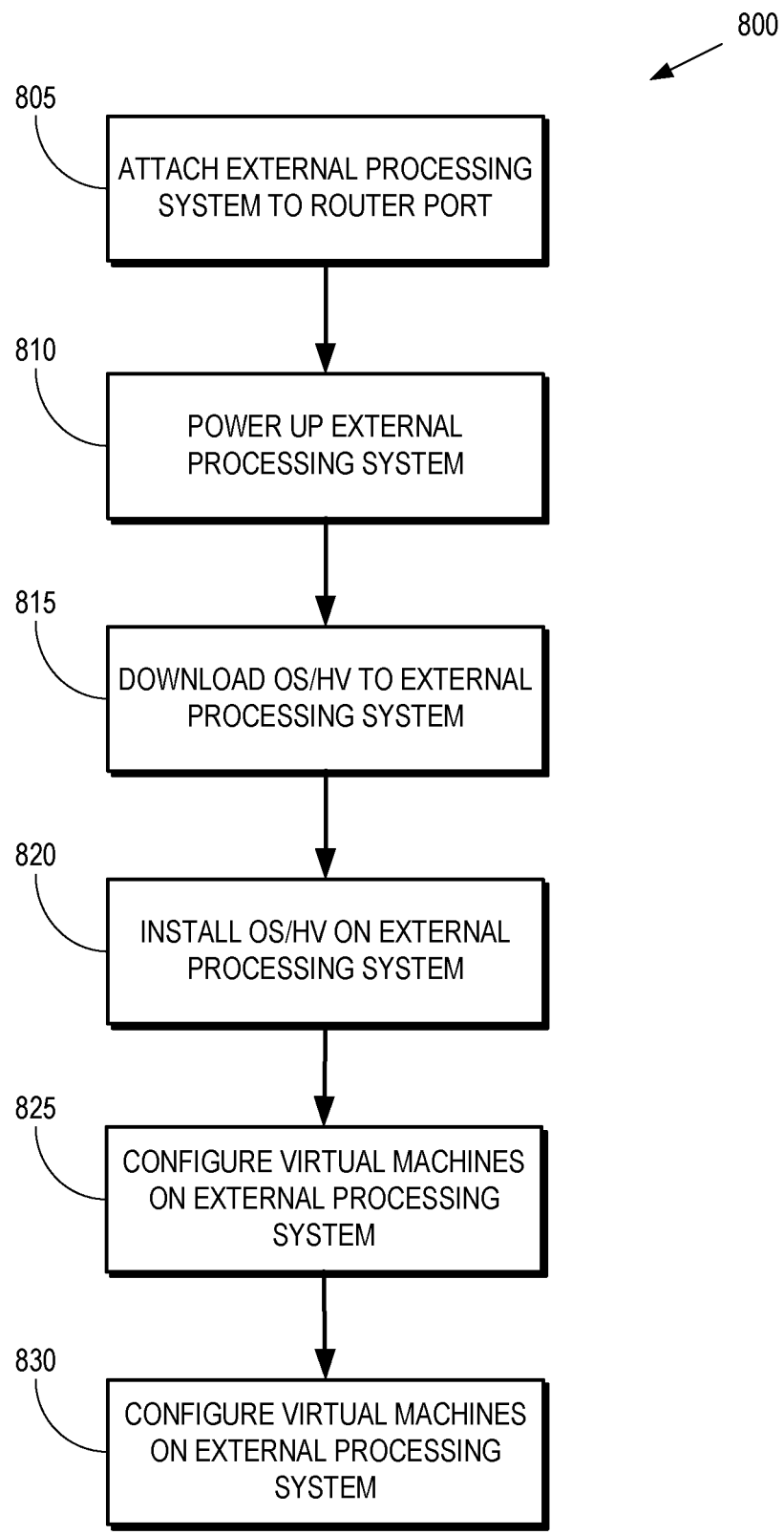
FIG. 8 is a flow diagram of a method of configuring virtual machines on an external processing system to provide general-purpose computing for a router according to some embodiments.

FIG. 8 is a flow diagram of a method 800 of configuring virtual machines on an external processing system to provide general-purpose computing for a router according to some embodiments. The method 800 is implemented in some embodiments of the communication system 100 shown in FIG. 1, the communication system 200 shown in FIG. 2, the communication system 500 shown in FIG. 5, the communication system 600 shown in FIG. 6, and the communication system 700 shown in FIG. 7.

At block 805, an external processing system is attached to a port of a router. At block 810, the external processing system is powered up. Although the block 810 is depicted as subsequent to the block 805 in FIG. 8, some embodiments of the method 800 perform these operations in a different sequence or concurrently.

In response to the external processing system being powered up and attached to the port of the router, the router provides (at block 815) information that represents an operating system and a hypervisor to the external processing system via the port used to connect the external processing system to the router. At block 820, the external processing system installs the operating system and the hypervisor using the information provided by the router.

At block 825, the external processing system installs one or more virtual machines in response to commands received from the router. Some embodiments of the commands include information indicating a type of the virtual machine, resources allocated to the virtual machine, and the like. The virtual machines are used to perform operations on packets received from the router. At block 830, the external processing system receives packets from the router and the virtual machines perform operations on the received packets. The results of the operations are then returned to the router.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., computer code or firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
a port configured to exchange signals with a router; and
at least one processor configured to receive, from the router via the port, information representing an operating system and a hypervisor in response to the apparatus being connected to the router via the port, and wherein the at least one processor is configured to instantiate the operating system and the hypervisor based on the received information.

2. The apparatus of claim 1, wherein the at least one processor is configured to perform a dynamic discovery process to discover a management Internet protocol (IP) address of the apparatus in response to the apparatus being connected to the router via the port.

3. The apparatus of claim 2, wherein the at least one processor is configured to obtain software configuration information from the router via the port.

4. The apparatus of claim 1, wherein the at least one processor is configured to boot up using the instantiated operating system and hypervisor.

5. The apparatus of claim 4, wherein the at least one processor is configured to receive a command from the router, wherein the command comprises information indicating a type of a virtual machine and resources to be allocated to the virtual machine.

6. The apparatus of claim 5, wherein the at least one processor is configured to instantiate the virtual machine using the operating system and the hypervisor in response to receiving the command.

7. The apparatus of claim 6, wherein the at least one processor is configured to allocate the resources indicated in the command to the virtual machine.

8. The apparatus of claim 7, wherein the virtual machine is configured to perform at least one operation on packets received from the router.

9. The apparatus of claim 8, wherein the at least one operation comprises at least one of network address translation, secure encryption/decryption, video transcoding, buffering, and filtering on packets received from the router.

10. The apparatus of claim 8, wherein the at least one processor is configured to return results of the at least one operation to the router via the port.

11. An apparatus, comprising:
a port allocated to an external processing system and configured to exchange signals with the external processing system; and
a controller configured to provide, to the external processing system via the port, information representing an operating system and a hypervisor in response to the external processing system being connected to the apparatus via the port.

12. The apparatus of claim 11, wherein the controller is configured to provide a management Internet protocol (IP) address to the external processing system in response to the external processing system being connected to the apparatus via the port.

13. The apparatus of claim 12, wherein the controller is configured to provide software configuration information to the external processing system via the port.

14. The apparatus of claim 11, wherein the external processing system is configured to install the operating system and the hypervisor based on the provided information, and wherein the external processing system is configured to boot up using the installed operating system and hypervisor.

15. The apparatus of claim 14, wherein the controller is configured to provide a command to the external processing system, wherein the command comprises information indicating a type of a virtual machine and resources to be allocated to the virtual machine.

16. The apparatus of claim 15, wherein the external processing system instantiates the virtual machine using the operating system and the hypervisor in response to the controller providing the command.

17. The apparatus of claim 16, wherein the controller provides, to the external processing system via the port, a request to perform at least one operation using the virtual machine, and wherein the controller receives results of the at least one operation from the external processing system via the port.

18. The apparatus of claim 17, wherein the at least one operation comprises at least one of network address translation, secure encryption/decryption, video transcoding, buffering, and filtering on packets received from the apparatus.

19. The apparatus of claim 11, further comprising:
a plurality of ports allocated to a corresponding plurality of external processing systems, wherein the controller is configured to provide, to the plurality of external processing systems via the plurality of ports, information representing an operating system and a hypervisor in response to the plurality of external processing systems being connected to the apparatus via the plurality of ports.

20. A method comprising:
exchanging signals between a processing system and a router via a port implemented in the processing system;
receiving, at the processing system from the router via the port, information representing an operating system and a hypervisor in response to the apparatus external processing system being connected to the router via the port; and
instantiating the operating system and the hypervisor on the processing system based on the received information.

21. A method comprising:
allocating a port in a router to an external processing system; and
providing, from the router to the external processing system via the port, information representing an operating system and a hypervisor in response to the external processing system being connected to the router via the port.

22. An apparatus comprising:
at least one processor; and
at least one memory including computer program code;
the at least one memory and the computer program code configured to, with the at least one processor, cause the apparatus at least to perform:
exchanging signals with a router via a port;
receiving, from the router via the port, information representing an operating system and a hypervisor in response to the apparatus being connected to the router via the port; and
instantiating the operating system and the hypervisor based on the received information.

23. An apparatus comprising:
at least one processor; and
at least one memory including computer program code;
the at least one memory and the computer program code configured to, with the at least one processor, cause the apparatus at least to perform:
allocating a port to an external processing system; and
providing, to the external processing system via the port, information representing an operating system and a hypervisor in response to the external processing system being connected to the apparatus via the port.

* * * * *